United States Patent [19]

Mallozzi et al.

[11] Patent Number: 4,642,791
[45] Date of Patent: Feb. 10, 1987

[54] INTERFACE FOR MAILING SYSTEM PERIPHERAL DEVICES

[75] Inventors: Joseph Mallozzi, Shelton; David E. Dinan; Edward P. Daniels, both of Bridgeport, all of Conn.

[73] Assignee: Pitney Bowes Inc., Stamford, Conn.

[21] Appl. No.: 532,251

[22] Filed: Sep. 15, 1983

[51] Int. Cl.$^4$ .............................................. G06F 3/00
[52] U.S. Cl. ................................................... 364/900
[58] Field of Search ....................... 364/200, 900, 466; 377/80; 177/25; 235/101; 455/608, 617

[56] References Cited

U.S. PATENT DOCUMENTS

| | | | |
|---|---|---|---|
| 3,374,467 | 3/1968 | Cast et al. | 364/900 |
| 3,975,712 | 8/1976 | Hepworth et al. | 364/200 |
| 4,048,673 | 9/1977 | Hendrig et al. | 364/200 |
| 4,065,662 | 12/1977 | Garczynski et al. | 364/900 |
| 4,071,887 | 1/1978 | Daly et al. | 364/900 |
| 4,168,469 | 9/1979 | Parikh et al. | 364/900 |
| 4,272,675 | 6/1981 | Blanford et al. | 234/463 |
| 4,395,756 | 7/1983 | Daniels | 364/200 |
| 4,410,961 | 10/1983 | Dlugos et al. | 364/900 |
| 4,410,962 | 10/1983 | Daniels et al. | 364/900 |
| 4,527,233 | 7/1985 | Ambrosius, III et al. | 314/200 |

OTHER PUBLICATIONS

"Microprocessor Peripherals UPI User Manual", Intel, Apr. 1982, pp. 5-634 to 5-635.
"Optoelectronics Data Book", TRW, Jan. 1985, p. 184.
"The TTL Data Book, vol. 1", 1984, Texas Instruments, pp. 2-8, 3-621, 3-755, 3-888, and 5-3.
"Technical Aspects of Data Communication", by John E. McNamara, Jul. 1979; p. 43.
Functional Description of "MM54HC74/MM74HC74, Dual D Flip-Flop with Preset and Clear", National Semiconductor.

Primary Examiner—James D. Thomas
Assistant Examiner—Thomas C. Lee
Attorney, Agent, or Firm—Robert H. Whisker; Melvin J. Scolnick; David E. Pitchenik

[57] ABSTRACT

An interface is connected between an OCIA type port and a mailing system peripheral, such as a weighing cell. The interface comprises an input data circuit, operatively connected to a serial data input line and to an associated input clock line, for receiving serial data input words comprising 8 serial data bits and an end-of-message (EOM) bit. The input circuit converts the serial input words into parallel form and transfers them to a programmable interface controller. The interface also includes an output circuit for transforming parallel output words from the interface controller into serial format. The output circuit is operatively connected to a serial data output line and an output data clock line from the OCIA type port. When an output data word is loaded into the output circuit the output line is forced to a predetermined logical level signalling the port the data is available. The port then provides a series of clock pulses to shift the data word out from the output circuit. When the data word is shifted out from the output circuit the circuit returns the output line to the initial state removing the data available signal. The programmable interface controller is responsive to a series of input words as messages from the OCIA type port. The interface controller is operatively connected to a weighing cell for providing weight and status information, and in response to a particular message, returns a message to the OCIA type port providing weight information and status information. In response to other messages, the programmable interface controller enters certain error routines, clears the interface to initial conditions, or resets the weighing cell to zero. The messages are provided in a predetermined format having header words descriptive of the meassage contents and ending in an error check word. The EOM bit of the error check word is of an opposite logical level from the EOM bit of the other words in a message and so indicates the end of the message.

5 Claims, 6 Drawing Figures

SUPERVISORY

| VLI | XCW | (TEXT) | ECC | |
|-----|-----|--------|-----|------|
| 02  | 06  | —      | 04  | ILLEGAL MESSAGE |
| 02  | 0E  | —      | 0C  | ECC ERROR |
| 02  | 0A  | —      | 0B  | FORMAT ERROR |
| 02  | 10  | —      | 12  | CLEAR |

VLI 30 (8 TEXT WORDS) ECC    ECHO BACK

SOLICITED MESSAGES

| VLI | XCW | TEXT 1 | TEXT 2 | ECC | |
|-----|-----|--------|--------|-----|---|
| 09  | 01  | 13     | 01     | 17  | REQUEST COUNT/STATUS |
| 04  | 01  | 13     | 02     | 14  | REQUEST ZERO RESET |

VLI  XCW  D7         D6      D5———D0   ECC   COUNT/STATUS MESSAGE
          ESCAPE     STATUS   6 DIGITS/
          CODE                WEIGHT COUNTS

| 0 | 0 | 1 | 1 | — | — | — | — |

— TARE OUTSIDE RANGE
— OVERWEIGHT
— DATA NOT VALID
— OUTSIDE ZERO

INTERFACE FOR MAILING SYSTEM PERIPHERAL DEVICES

BACKGROUND OF THE INVENTION

This invention relates to postal systems for determining the proper postage for items to be mailed. More particularly it relates to an interface between a weighing cell for determining the weight of such items and a data processing system for determining the appropriate postage in accordance with such weight and other postal information.

Postal systems for automatically determining the appropriate postage for items to be mailed are well known in the art and have contributed greatly to increased efficiency in mail handling procedures. One such system is described in U.S. Pat. No. 4,395,756 to Edward P. Daniels, July 26, 1983. The system disclosed in this patent comprises a microprocessor based system processor with a keyboard and display, a scale subsystem processor, forming part of a weighing cell, for providing weight information in digital form to the systems processor and a plurality of peripheral postal devices interfaced to the system processor. Another such system is disclosed in copending, commonly assigned patent application Ser. No. 430,091, now, U.S. Pat. No. 4,603,400, by Edward P. Daniels, filed Sept. 30, 1982, which describes a postal system comprising a microprocessor based system processor with keyboard and display, a scale weighing device operatively connected to the system processor and, postage printing subsystem and peripheral subsystem processors connected to the system processor through a serial communications interface.

Each of the above systems share the common feature of being an integrated system where all major system and interface are provided by one system vendor and are designed by that vendor to be compatible. However, with the increased computational load that is required from current generation mailing systems it is desirable to be able to interface mailing system peripherals to microcomputer systems provided by vendors who do not normally participate in the mailing system market. This capability is particularly desirable to allow a digital systems vendor to join with a traditional mailing systems vendor in seeking some of the very large contracts being awarded by the U.S. Postal Service, as well as foreign post offices, as they begin to automate their operations.

One particularly desirable interface would provide for the interconnection of mailing systems peripherals to data processing systems having ports of the type known as Optically Coupled Interface Adaptor and described in the attached Appendix. Such ports have separate serial input and output lines, each having an associated clock line. The port outputs data by strobing out a serial data word on a Send DATA (SDATA) line with a burst of clock pulses on the associated clock line. Data may be sent at an arbitrary time. Data is input to the port by strobing in a serial data word on a Receive DATA (RDATA) line with a burst of clock pulses on the other associated line, when the Receive Data line is driven to an asserted state. (Ports of this type will hereinafter be referred to a OCIA type ports.)

Thus, it is an object of this invention to provide an interface between mailing system peripherals and OCIA type ports.

It is a further object of this invention to provide an interface between a weighing cell and an OCIA type port.

It is still a further object to provide an interface where weight information may be received from the weighing cell as a series of coded digits representing the weight of an item to be mailed in arbitrary weight units and wherein the weight information is accompanied by status information from the weighing cell.

BRIEF SUMMARY OF THE INVENTION

The above objects are achieved and the disadvantages of the prior art are overcome by means of an interface between a weighing cell providing weight information in the form of coded digits representative of arbitrary weight units and an OCIA type port of a data processing system. The interface comprises a data input serial to parallel converter which is operatively connected to the SDATA line and to its associated input clock line to receive an input word on the SDATA line strobed in by a series of clock pulses on the input clock line, and a data output parallel to serial converter which is operatively connected to the RDATA line and to the associated output clock line to receive a parallel output data word and for strobing such word on the RDATA line in serial format by means of series of clock pulses on the associated output clock line. A programmable interface controller is operatively connected to the input serial to parallel converter, to the output parallel to serial converter and to the weighing cell; to receive the input words in parallel form from the input converter, sequences of such words defining messages, to respond to one particular message by requesting weight information from the weighing cell, and to receive the weight information and transfer that information to the output parallel to serial converter.

In a preferred embodiment of the subject invention the programmable interface controller is responsive to another particular message to transmit a reset-to-zero command to the weighing cell.

In another preferred embodiment of the subject invention the programmable controller is responsive to stil another particular message to echo that message back to the OCIA port.

Thus, it can be seen that the subject invention advantageously provides an interface between OCIA type ports and mailing system peripherals, particularly weighing cells, which is highly adaptable to various message level protocols; may readily be adapted to a variety of mailing system peripherals; and yet retains a simple architecture.

Other objects and advantages of the subject invention will be readily apparent to those skilled in the art from consideration of the detailed description set forth below in conjunction with the attached drawings.

DETAILED DESCRIPTION OF PREFERRED EMBODIMENTS OF THE SUBJECT INVENTION

Figure 1:
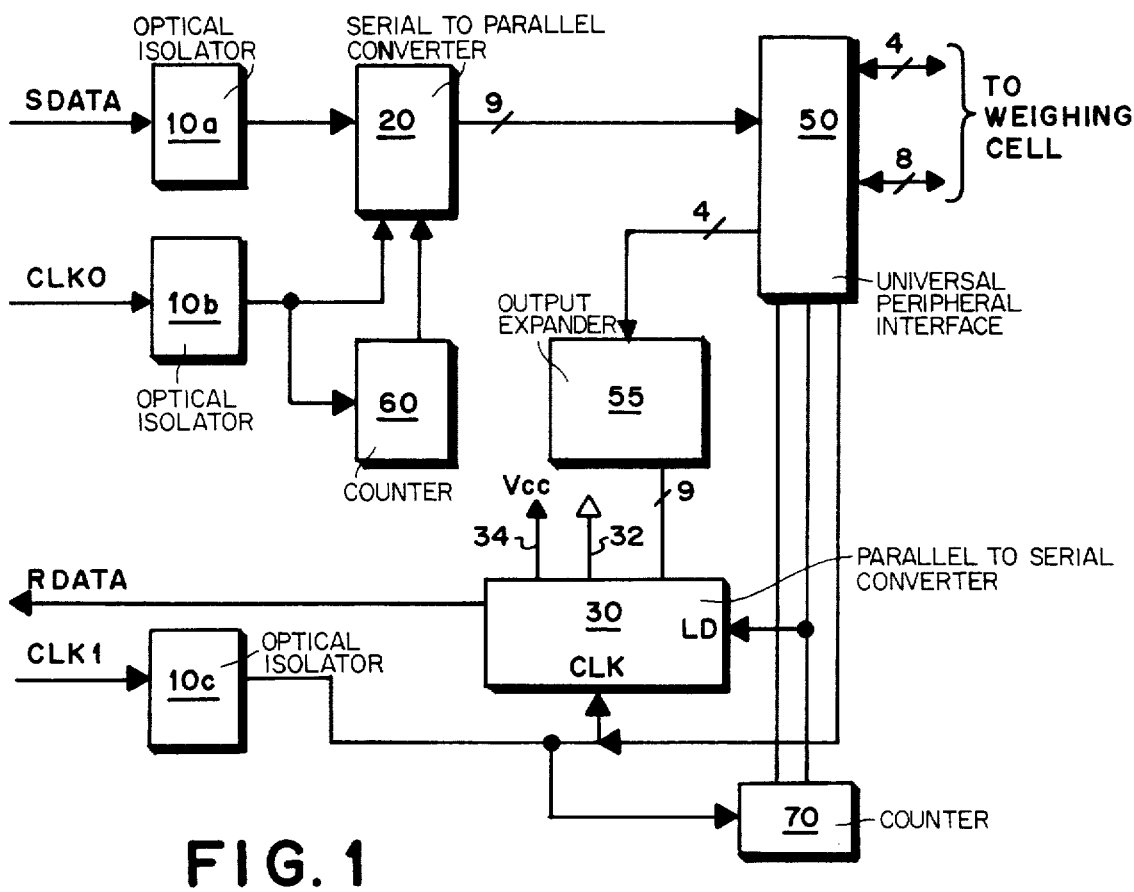
FIG. 1 shows a schematic block diagram of an interface circuit in accordance with the subject invention.

FIG. 1 shows a block diagram of the interface of the subject invention. Serial data input line SDATA and its associated clock line CLK0 are received by optical isolators 10a and 10b, which may be type 6N136 optically coupled isolators. The serial bit stream on the SDATA line is clocked into serial to parallel converter 20, which may comprise a type 74LS164A bit parallel out serial shift register and a type 74LS273 octal D/type flip/flop register, with clear, and two 74LS74 D/type flip/flops, used to extend each register, as well as associated logic. Serial to parallel converter 20 is controlled by counter 60, which may be a type 74LS193 synchronous 4 bit up/down counter. Counter 60 also receives the clock signal from isolator 10b and controls the transfer of a nine (9) bit input word from the shift register to the flip/flop register.

As each nine bit input word is converted from serial to parallel form by converter 20 it is transmitted to programmable interface controller 50, which may be a type 8741A universal peripheral interface eight (8) bit microcomputer.

Figure 2A:
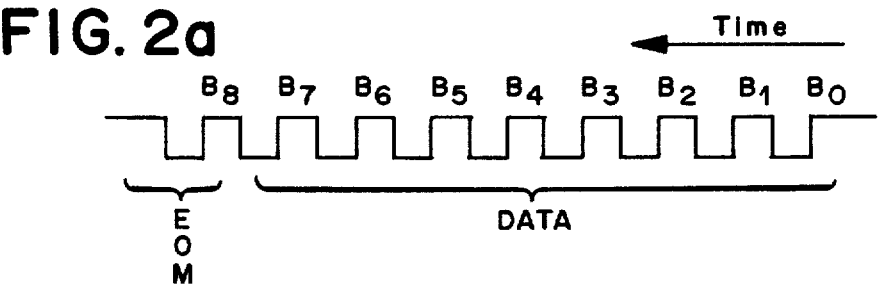
FIGS. 2(a) and 2(b) show the timing and bit level protocols for communications between the subject interface and an OCIA type port.

The format of the nine (9) bit input words clocked into serial parallel converter 20 is shown in FIG. 2a. Each such word consists of eight (8) data bits and an end-of-message (EOM) bit as the last bit in each input word. The OCIA port (not shown) communicates with the interface of the subject invention in messages which consists of strings of such data words. The EOM bit is a logical one for each word in a message except for the last word, wherein, the EOM bit is a logical 0 to define the end of the message. The OCIA type interface may output a word at anytime, with the only restriction being that the OCIA type port must maintain a minimal separation between words to allow the interface to process an input word. Typically, this separation is about 43 microseconds.

Universal interface controller 50 receives input messages from serial to parallel converter 20 and is programmed to interpret such messages and control the subject interface and the weighing cell (not shown) accordingly. Interface controller 50 responds, as necessary, to the OCIA type port through optional I/O expander 55, which may be a type 8243N/output expander, and through parallel to serial converter 30.

Figure 2B:
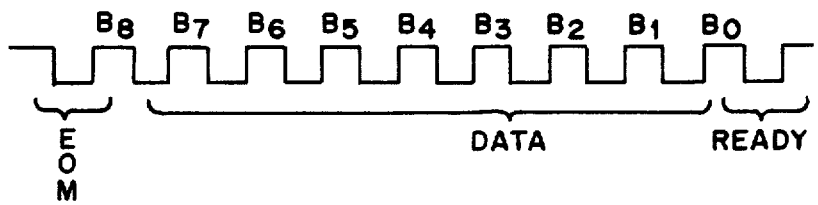

Parallel to serial converter 30 comprises an eleven (11) bit parallel input, serial out shift register which is operatively connected to the RDATA line and the the CLKI line. The CLKI line is isolated by isolator 10c, similar to isolaters 10a and 10b, while the RDATA line is isolated by an isolator in the OCIA interface. Programmable interface controller 50 assembles a nine (9) bit output word in I/O expander 55 and loads that word into nine (9) bits of parallel to serial converter 30. The nine (9) bit output word has the same format as the nine (9) bit input word discussed above; eight (8) data bits followed by a EOM bit which defines the last word of a message. The first and second bits of converter 30 are hard-wired through lines 32 and 34 so that the first bit is set to logical zero state and the second bit is set to a logical one state when the output data word is loaded. Controller 50 them provides a shift signal to set the first bit to a logical one state to signal to the OCIA type port that the subject interface is ready to transmit a serial data output word. The OCIA type port responds when ready with a series of ten clock pulses as shown in FIG. 2b. These ten pulses shift the data ready bit, the 8 data bits and the EOM bit into the OCIA type port. The CLKI signal is also received by a counter 70 which signals interface controller 50 when the output data word has been shifted out from converter 30 and initiates a load signal which resets the first and second bits of converter 30 so that a logical zero is held on the output line until a new output word is loaded and another shift signal is received.

Programmable interface controller 50 is also operatively connected to the weighing cell (not shown) to receive weight and status information. The weighing cell (not shown) is a conventional processor controlled weighing cell which provides weight and status information in digital form. The operation of such processor control weighing cells and techniques for interfacing such weighing cells to a programmable interface controller such as that used in the subject interface is well understood by those skilled in the art and need not be discussed further here for an understanding of the subject invention. Weight information is transferred from the weighing cell to interface controller 50 as 8 bit coded decimal digit representations of arbitrary weight units. preferably such weight units represent one one hundred and twentieth of an ounce. The series of coded decimal digits is followed by an eight bit status word, which has only four status bits defined, to complete the weight and status message from the weighing cell. The weight and status information is reformatted by interface controller 50 into OCIA compatible messages as will be described more fully below.

Figures 3, 4, 5:
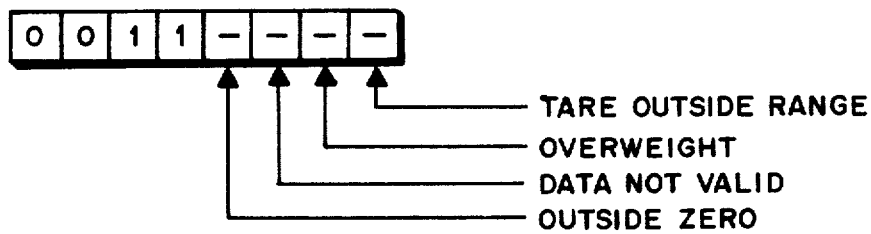
FIGS. 3 and 4 show sequences of words which constitute valid messages for an OCIA type port.
FIG. 5 shows a weighing cell status word.

Programmable interface controller 50 is programmed to communicate with the OCIA type port in groups of input and output words forming messages. The format of these messages is shown in FIGS. 3 and 4. Each message begins with a Variable Length Indicator (VLI) which gives the number of words to follow in the message, the next word is the Transfer Control Word (XCW) which defines various error status which will be described more fully below. Following these two words the message may include up to 256 words of text. The message ends with an Error Check Character (ECC) which is formed by exclusive "Oring" of all preceding words in the message.

Messages received from the OCIA type port are of one or two types, either a supervisory messages or a solicited messages. Supervisory messages indicate certain error status to the subject interface or provide certain simple commands. Thus, in FIG. 3 a message indicating that the message previously received by the OCIA type port was an illegal message consists of a VLI word having a hexadecimal value of 02 to, and XCW word having a hexadecimal value of 06, containing no text, and having a ECC word having a hexadecimal value of 04. Similarly, messages indicating ECC errors and format errors would have XCW words having values of 0E and 0A respectively. In response to these error messages the subject interface would enter an error routine to retransmit the previously transmitted message. In response to a supervisory message having the values VLI=02, XCW=10, ECC=12 programmable interface controller 50 would issue a clear command to reset initial conditions. Controller 50 is also programmed to retransmit a supervisory message, modified in accordance with the appended OCIA description having the XCW word equal to 30 and containing 8 text words back to the OCIA type port. This echoback capability provides a means whereby the data processing system may check the integrity of the data link to the subject interface.

Programmable interface 50 is also responsive to two solicited messages as shown in FIG. 3. A first solicited message having XCW word equal to 01 and two text words having hexadecimal values of 13, and 01, in that order, is interpreted as a request for count/status. In response to this message the subject interface transmits to the OCIA type port a message, giving the status of the weighing cell and the current value of the weight as measured by the weighing cell, in a form which will be described more fully below. A message having XCW word equal to 01 and text words having values of 13 and 02, in that order, is interpreted as a request for 0 reset and in response the subject interface issues a 0 reset command and to the weighing cell.

As indicated above the subject interface receives weight information from the weighing cell in the form of coded decimal digits representing arbitrary weight units. These weight units are commonly referred to as "counts" and preferably have a value of one one hundredth twentieth of an ounce. The weighing cell transmits 6 words representing ASCII coded decimal digits up to a count value equal to 70 lbs., ½ ounce (136,380). The weighing cell also transmits a status word containing four status bits as shown in FIG. 5. The Tare Outside Range bit indicates the possibility that same object remains on the scale and should be removed by the operator, the Overweight bit indicates that the weight of the item is greater than 70 lbs., ½ ounce, the Data Not Valid bit indicates that the weight reading is not valid because power has just been turned on, the scale is in motion, or the 0 has not been recaptured, and the Outside 0 bit indicates that the weight reading is too great for the weighing cell to recapture the 0 value and that a reset 0 command should be issued.

Controller 50 assembles this weight information and status word into a message format compatible with the OCIA type port as shown in FIG. 4. Such a message includes an appropriate VLI word, XCW equal to 01, a text word, D7, defining an escape code, a text word D6, containing the status word, 6 text words, D5-D0 containing the ASCII coded digits of the count value and the ECC word. (Escape codes precede and characterize all status characters transmitted through the OCIA type port and are used internally by the data processing system. A more detailed description of the use of escape codes is given in the appendix and a more detailed description is not believed necessary to an understanding of the subject invention.)

It is believed that the detailed coding of a programmable interface controller, such as a type 8741A, as well as the detailed logic design of the circuit of FIG. 1 are routine tasks well within the ability of those skilled in the art. Particular circuits noted as being preferred in the detailed description are all commonly known commercially available integrated circuits available from vendors such as the Intel Corporation of Santa Clara, Calif.

APPENDIX

3.1.4 CLKI (Receive Data Clock)

The NCR equipment will detect a transition on the RDATA line from logical "0" to "1" (i.e., Ready Status). Within 1.5 usec to 1 sec. the NCR equipment will provide the first clock pulse, acknowledgize RDATA. Refer to FIG. 3.1. Subsequently nine clock pulses are required by the NCR equipment to completely transfer a character from the RDATA line. The OCIA peripheral should output the next bit within 0.8 usec of the falling edge of CLKI. The clock pulses are not symetrical and range from a minimum of 1.5 usec to a maximum of 250 usec. A pulse width of 10.4 usec is considered nominal.

3.2 Intercharacter Timing

The timing between the last CLKO pulse of one character and the first CLKO pulse of the next character will not be less than 6 usec. The maximum time between characters is 1 second. Nominally intercharacter timing is 40 usec.

3.3 Ready Status Protection

The OCIA peripheral is responsible for the protection of the RDATA line against noise that might be interpreted by the NCR equipment as a Ready Status. The Ready Statys must remain at logical "0" during a power-up or power-down of the OCIA peripheral.

4.0 SOFTWARE ENVIRONMENT

Software within the NCR virtual machine insures data integrity and provides an interface to the application programs. This interface is a standard for all OCIA device application programs.

4.1 Physical Configuration

The software exists in a Micro-processor Real-Time Executive (MRX) based terminal system. The minimal system configuration is as follows:
NCR MRX based virtual machine
1-4 populated OCIA ports
OCIA interface to peripherals
OCIA Communications Driver/Manager Module
OCIA Driver Module

4.2 Interfaces Supported

The OCIA communications manager (OCIA-F) module within the virtual machine supports only full format data fields:

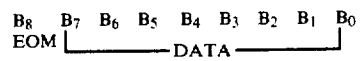

Where:
Bit 8 is the end of message indicator. The bit set to 1 indicates the end of message, while a 0 indicates additional data to follow.
Bits 7-0 are the data bits representing one byte within the message being transferred.

The OCIA-F module supports a data transfer rate of 48K.

4.3 Data Transfer Protocol

4.3.1 Message Formats

Messages transferred between the NCR virtual machine and OCIA devices must conform to a specific message format. This message format consists of from 3 to 256 data bytes. The basic message format is as follows:

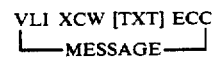

Each byte of data is transferred in the order indicated beginning with the VLI. The only exception being that of the optional TXT bytes, which are sometimes omitted from supervisory control messages.

4.3.1 Variable Length Indicator (VLI)

The VLI is a required binary value that represents the total number of message bytes to be transferred. The VLI and ECC bytes are included in this value. The value of the VLI must be at least 0.02H, indicating a three-byte message (i.e., supervisory control messages).

4.3.1.2 Transfer Control Word (XCW)

This mandatory byte controls the mode of operation, retransmissions and line status between the OCIA-F module and OCIA device. Two transfer modes are currently defined, text and supervisory. The format of the byte is as follows:

| $B_7$ | $B_6$ | $B_5$ | $B_4$ | $B_3$ | $B_2$ | $B_1$ | $B_0$ |
|---|---|---|---|---|---|---|---|
| RESERVE | | SC | | MS | | | MT |

4.3.1.2.1 Message Type (MT)

The least significant bit ($B_0$) of the XCW represents the message type. If MT is "0" then the message is a supervisory control. MT set to "1" indicates that the message contains information in the TXT field and is a text message. Supervisory control does not contain a TXT field with the exception of a message loopback request.

4.3.1.2.2 Message Status (MS)

This three-bit sub-field ($B_3$–$B_1$) represents the status of the last message is transferred. The following describes the valid status entries:

| | MS | | |
|---|---|---|---|
| $B_3$ | $B_2$ | $B_1$ | Definition |
| 0 | 0 | 0 | Normal response |
| 0 | 1 | 1 | Illegal message |
| 1 | 0 | 1 | Format error |
| 1 | 1 | 1 | ECC error |

4.3.1.2.2.1 Normal Response Status

This indicates that the message has been received by the device or OCIA-F module and no transmission errors were detected.

4.3.1.2.2.2 Illegal Message Status

This response indicates that the device or application program has received an illegal or ambiguous message. The function is aborted by the OCIA-F module and device is commanded to reset.
This status is caused by:
unsupported excape code
improper XCW
non-ASCII text unless preceded by excape character 15H 4.3.1.2.2.3 Format Error This response indicates that the message received by the terminal did not conform to proper size.
This status is caused by:
illegal VLI
buffer overflow 4.3.1.2.2.4 ECC Error Detected Status Receipt of this data integrity error status by the OCIA-F module causes a retransmission of the last message. This status sent to the OCIA device causes a retransmission of the last message.

4.3.1.2.3 Supervisory Control Function (SC)

This sub-field consists of two bits ($B_4$–$B_5$) and conveys supervisory information to the device. The following codes are defined for the supervisory control entry:

| SC | | |
|---|---|---|
| $B_5$ | $B_4$ | Definition |
| 0 | 0 | Normal data messages |
| 0 | 1 | Reset or Clear |
| 1 | 1 | Message loop-back |

4.3.1.2.3.1 Normal Data Message

This function requests the device to process the subsequent text data as specified by the complete message.

4.3.1.2.3.2 Reset or Clear

The device is requested to take the necessary action to reset or clear the hardware. This is not sent by the peripheral. If it is it will result in a format error.

4.3.1.2.3.3 Message Loopback

This message always originates with the NCR equipment. from NCR terminal:

| VLI | XCW | ID | TEXT | DATA | ECC |
|---|---|---|---|---|---|
| 05H | 30H | 30H | 55H | AAH | FAH |

Upon receipt of this message the OCIA peripheral device will insert its device ID into the ID byte field of the message, recalculate and insert a new ECC, and return the message with no further action taken.

from OCIA peripheral device:

| VLI | XCW | ID | TEXT | DATA | ECC |
|---|---|---|---|---|---|
| 05H | 30H | XXH | 55H | AAH | XXH |

The following are the device ID's assigned to the PRISM postal devices:

| ID | DEVICE |
|---|---|
| 30H | NCR 2951 Terminal |
| 31H * | Pitney Bowes Load Cell (Scale) |
| 32H * | Pitney Bowes Meter Strip Dispenser |
| 33H + | Pitney Bowes Stamp Dispenser |
| 34H + | INTERMEC Bar Code Reader |
| 35H + | INTERMEC Bar Code Printer |
| 36H * | BOCA Money Order Imprinter |
| 37H + | Platform Scale |
| 38H * | Caere OCR |

\* OCIA device
\+ RS232 device 4.3.1.3 Text (TXT)

The text portion of each message is optional when only supervisory control is performed by the application program. This field, when supplied, contains from 1 to 253 characters. The characters comprise the function, status or text data specific to the OCIA device.

Functions, request of data type and status escape sequences, are identified by an ASCII character in the range 10H through 1FH. The definition of these escape sequences are device dependent and their definitions vary for each OCIA device (see Appendices B, C, D and E).

The character immediately following the escape character (10H–1FH) may be any eight bit value. All other characters in the message must be in the range of ASCII characters (20H–5FH). Escape character 15H is an exception to this rule. Refer to Appendix A.

Text data messages are also device dependent. These characters are transferred between the OCIA device and NCR virtual machine in ASCII formats 20H through 5FH. The format of the text data portion of the messages varies for each OCIA device to be controlled (see Appendices B, C, D and E).

4.3.1.3.1 Text Escape Characters

Several escape characters are defined to delimit functions, requested data, or status within the text (TXT) portion of the message. The standard escape sequences are as follows:

| ESCAPE | DESCRIPTION |
|---|---|
| 10H | Non-recoverable error |
| 11H | Operator recoverable error |
| 12H | Recoverable error/procedure |
| 13H | Function or request of data type sent from NCR equipment |
| 14H | Function or request of data type sent from OCIA peripheral |
| 15H | This will consist of the escape byte (15H), followed by a binary byte followed by N number of packed BCD data bytes. |
| 16H-1FH | Reserved for future use |

4.3.1.3.2 Errors and Warning Types

Escape characters 10H, 11H and 12H are defined to be status type escapse sequences. The OCIA peripheral should not attempt to report any error that could affect the integrity of the communications (e.g., ROM checksum errors), but instead cease communications with the NCR equipment.

Escape character 10H identifies a non-recoverable device error. These are errors that require a service call to correct. The format of this sequence is:

··· | 10H | XXH | ASCII DESCRIPTOR | ···

An error message is displayed on the NCR equipment indicating the logical unit number, component failure descriptor (XXH) in hexidecimal ASCII and an optional 40 character ASCII descriptor supplied by the peripheral. The ASCII descriptor may be used to further identify the peripheral and component in error.

Escape characters 11H identifies device errors that are operator recoverable (e.g., out-of-paper). The operator is prompted to take corrective action according to the error description byte following the 11H. Corrective action may involve pressing a specific function key on the NCR terminal causing the application to take appropriate action.

Recoverable errors that do not require operator intervention or warning messages (i.e., paper low) are identified by the escape character 12H. If a recovery is possible an appropriate message is sent to the peripheral by the application program.

4.3.1.3.3 Functions or Request of Data Type

Functions or request for data are identified by escape characters 13H and 14H. Those functions or data requests originating from the NCR equipment begin with the 13H escape character (e.g., send totals). Functions or data requests originating from the OCIA peripheral are prefaced with a 14H escape code (e.g., retransmit programmabilities).

4.3.3.1.3 Data Format Descriptor Type

An escape character is provided to facilitate formatting of ASCII data. The character 15H specifies that the next byte is a format descriptor for the subsequent packed BCD data. An example sequence is as follows:

··· | 15H | XXH | 52H | 01H | 23H | 45H | ···

4.3.1.4 Error Check Character (ECC)

To insure a level of data integrity, the sending unit must compute an error check character. This character is computed, such that each bit position is the result of an "Exclusive or" of all the same bit positions of each character in the message (i.e., from VLI through TXT).

4.3.2 Message Conventions 4.3.2.1 Acknowledgement (ACK)

4.3.2.1.1 No Reply Required

If a message is received correctly and does not require a response an implicit acknowledgement will be assumed after an elapsed time 500 msec has passed without the originator of the message receiving negative achknowledgement (NAK).

4.3.2.1.2 Reply Required

If a message is received correctly and requires a reply (i.e. request for data), the receipt of the data message, with the MS field of the XCW byte equal to zero, will constitute an acknowledgement.

4.3.2.21 Negative Acknowledgement (NAK)

4.3.2.2.1 OCDM to OCIA device

When the device sends a message to the OCDM and the OCDM detects a communication error (see section 4.3.1.2.2—Message Status), the OCDM will send a supervisory message with a NAK status to the device The device will execute a software reset and discard any queued messages. The OCDM will then notify the postal application of the error and the postal application will initiate a recovery procedure and retry the transaction.

4.3.2.2.2 OCIA device to OCDM when the OCDM sends a message to the device and the device detects communication error, the device will send a supervisory message with a NAK status to the OCDM. The device will ignore any message in which a communication error is detected. The OCDM will either retransmit the original message (in the case of an ECC error) or notify the application of the error (in the case of an illegal message error or a format error).

4.4 Application Interface

An application program resides in the MRX virtual machine and accesses the OCIA-F manager directly. To access the OCIA-F manager, the application uses an ACCEPT type command to input data and DISPLAY type command to output data.

Several distinct operations are required to be performed by the BASIC application to initialize each logical unit. These operations vary with the specific OCIA devices being controlled. These initialization sequences supply the OCIA-F manager with information and programmabilities for each logic unit.

Function and status codes are assigned by the OCIA manager and driver. Some codes are standard, while others are unique to the specific OCIA device (see appropriate appendix). The OCIA-F manager implementation specification gives a detailed description of each standard and specific code.

5.0 PHYSICAL ENVIRONMENT

5.1 Temperature, Humidity and Barometric Pressure

5.1.1 Storage Range

Equipment designs in all operating ranges will be expected to encounter the conditions shown in Table 5.0 for periods of up to three months.

TABLE 5.0

| Storage Conditions | |
|---|---|
| Temperature Range | −10° C. to 50° C. (14° F. to 120° F.) |
| Temperature Change | 15° C. (27° F.) per hour |
| Humidity Range | 10% to 90% RH |

It is noted that the detailed description and the attached drawings have been provided by way of illustration only and that numerous other embodiments of the subject invention will be apparent to those skilled in the art. Particularly it is noted that innumerable other communication protocols would be compatible with the bit level protocol described above. Thus, limitations on the subject invention are to be found only in the claims set forth below.

What is claimed is:

1. An interface between a weighing cell providing weight information in the form of coded digits representative of arbitrary weight units and an OCIA type port for a data processing system, comprising:
   (a) data input means connected to a serial data input line and to an associated input clock line, both from said OCIA type port, for receiving serial data input words shifted individually into said input means from said serial data input line by series of clock pulses of a predetermined length on said input clock line and for converting said serial data input words to parallel input words individually;
   (b) data output means connected to a serial data output line and to an associated output clock line, both to said OCIA port, for receiving parallel data output words individually and for shifting said data output words individually out on said output line in a serial format by means of series of clock pulses of a predetermined length received on said output clock line, said output means further comprising:
      (1) a parallel loaded shift register, said shift register having a first stage, a second stage and a further plurality of stages, said stages each having an input and an output, said first stage's input being hard-wired to a predetermined logic level indicative of an inactive state of said output means, said second stage's input being hard-wired to the opposite logic level to said predetermined level indicative of a data available state of said output means, and the inputs of said plurality of stages receiving said individual parallel data output words, and said shift register having said first stage output connected to said data output line and a clock input connected to said output clock line and to an interface control means for receiving clock signals to shift data in said shift register, whereby when said individual parallel data output word is loaded into said shift register and shifted once said indicative opposite logic level is placed on said output line to signal said port on said output line that data is available, said port responding to said indicative opposite logic level by providing series of clock pulses to shift out the contents of said first stage (equal to said indicative opposite logic level) and said individual parallel data output word to said port, and;
      (2) means responsive to said series of clock pulses for signalling to said interface control means when said output means has transferred said individual output data word to said port and for then initiating a load operation to reset said first stage to said predetermined logic level;
   (c) said interface control means being connected to said data input means and said data output means, and connected to said weighing cell for
      (1) receiving said parallel input words individually, sequences of said words defining a plurality of types of messages;
      (2) in response to one particular type of said messages, receiving weight information from said weighing cell; and,
      (3) transferring said parallel data output words representative of said weight information to said output means.

2. An interface as described in claim 1 wherein said interface control means is further for receiving said weight information as sequences of parallel weight data words representative of coded digits and reformatting said weight information into messages having a text and compatible with said OCIA type port before transferring said information to said output means.

3. An interface as described in claim 2 wherein said reformatting by said control means comprises the addition of an end of message (EOM) bit to each of said weight data words, said text of said messages consisting of said sequences of said weight data words so reformatted.

4. An interface as described in claim 3 wherein said reformatting further comprises prefixing said messages with header words descriptive to said messages and appending to said messages error check words, said header words and said error check words each including an EOM bit, the EOM bits of said error check words having a predetermined logical value and the EOM bits of all other words in said messages having the opposite value, whereby said error check words delimit said messages.

5. A parallel to serial conversion circuit for providing a serial output to an OCIA type port which includes a serial data output line, and an output clock line, and said port being responsive to the presence of a data ready signal on said data output line to generate N+1 clock pulses on said output clock line; said circuit comprising a parallel loaded shift register having a first stage, a second stage, N additional stages, said stages each having an input and an output, a load signal input, a first clock input connected to said output clock line, a second clock input for receiving an initial clock pulse, and first stage's output connected to said serial data output line, the input of said first stage being hard-wired to a logic level indicative of an inactive state, the input of said second stage being hard-wired to an opposite logic level indicative of said data ready signal, the inputs of said N additional stages receiving a parallel data output word in response to a first load signal; and means responsive to said N+1 clock pulses for generating a second load signal thereafter; whereby said circuit responds to a first load signal to load said parallel data output word, to said initial clock pulse for shifting said register to place said data ready signal on said output line, to said N+1 clock pulses to shift out said data ready signal and said data output word, and to said generated second load signal to reset said first bit to said inactive state.

* * * * *